United States Patent [19]

Hino et al.

[11] 3,775,568

[45] Nov. 27, 1973

[54] SIGNAL RECORDING AND REPRODUCING APPARATUS AND SIGNAL TRANSMISSION SYSTEM

[75] Inventors: Tetsuo Hino, Hirakata; Isao Kozu, Osaka; Susumu Hashiguchi, Hirakata; Takenori Akamine, Moriguchi; Katsutoshi Nishimura, Osaka; Takao Orita, Suita; Kiyoji Fujisawa, Hirakata; Akio Nishiyama, Toyonaka, all of Japan

[73] Assignee: Matsushita Electric Industrial Co. Ltd., Osaka, Japan

[22] Filed: Nov. 4, 1971

[21] Appl. No.: 195,721

[30] Foreign Application Priority Data

Nov. 6, 1970 Japan ................................ 45/98443
Nov. 7, 1970 Japan ................................ 45/98588

[52] U.S. Cl. 179/100.2 R, 179/100.2 E, 340/174.1 K
[51] Int. Cl. ......................... G11b 5/86, G11b 19/28
[58] Field of Search .............. 179/100.2 E, 100.2 R, 179/100.2 MD, 100.2 B, 100.2 K, 100.1 A, 6.6 DD; 340/174.1 K; 274/4 H

[56] References Cited

UNITED STATES PATENTS 2,828,367 3/1958 Sibbet .......................... 179/100.2 R
2,879,499 3/1959 Ackerlind .................... 179/100.2 R
2,625,611 1/1953 Roberts ........................ 179/100.2 R
3,485,961 12/1969 Lovick et al. ................ 179/100.2 E

*Primary Examiner*—Vincent P. Canney
*Assistant Examiner*—Alfred H. Eddleman
*Attorney*—E. F. Wenderoth et al.

[57] ABSTRACT

A signal recording and reproducing apparatus comprises a magnetic disc recorder and a magnetic tape recorder. Signals reproduced from a magnetic disc are recorded on a magnetic tape during low speed rotation of the magnetic disc and movement of the magnetic tape which is moved synchronously with the low speed rotation of the magnetic disc, whereby the influence of the irregularity of the rotation of the magnetic disc and the movement of the magnetic tape on the signals is eliminated. The apparatus can also be used as a signal transmission system by including a transmitting device and a receiving device. The transmitting device reproduces signals recorded on the magnetic disc and transmits the reproduced signals to the receiving device through a transmission line during the low speed rotation of the magnetic disc. The receiving device records the transmitted signals on a magnetic disc during the low speed rotation. The reproduced signals are transmitted as soon as the low speed rotation is started and the transmitted signals are recorded by detection of the beginning and the end of the transmitted signals.

11 Claims, 27 Drawing Figures

United States Patent [19]
Hino et al.
[11] 3,775,568
[45] Nov. 27, 1973
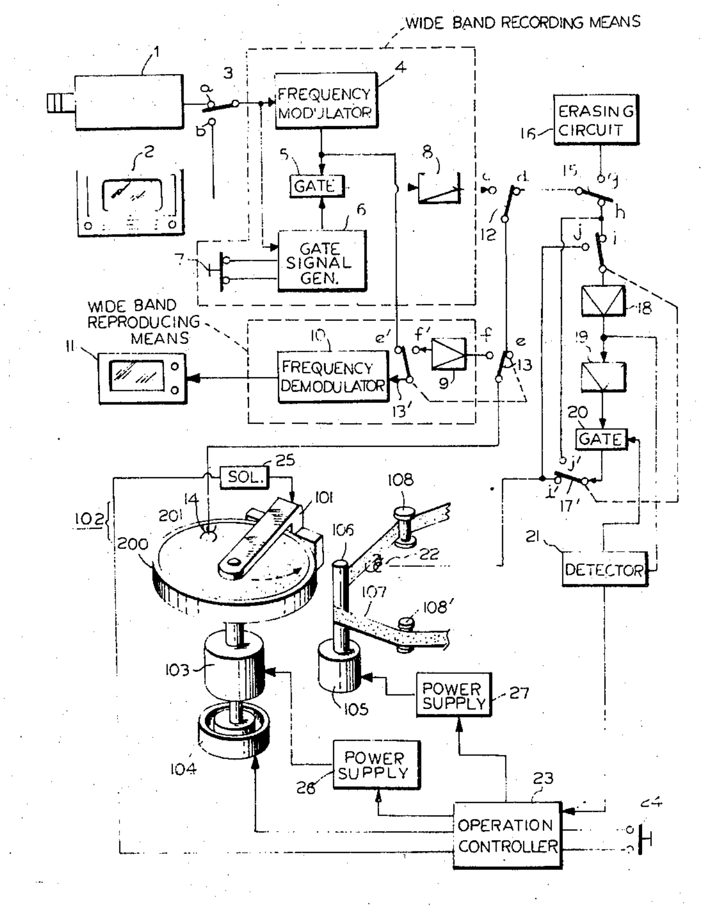

SIGNAL RECORDING AND REPRODUCING APPARATUS AND SIGNAL TRANSMISSION SYSTEM

BACKGROUND AND FIELD OF THE INVENTION

In a signal recording and reproducing apparatus, the signals recorded on a rotatable magnetic disc are converted from a wide band to a narrow band by changing the rotational speed of the magnetic disc from a high speed to a low speed and the narrow band signals are reproduced from the magnetic disc so as record the reproduced signals on a magnetic tape on which the successive signals are recorded in a longitudinal direction, and the frequency of the recorded signals on the magnetic tape fluctuates due to the irregularity of the low speed rotation of the magnetic disc and the movement of the magnetic tape. For decreasing the influence of such irregularity, it is necessary to use a signal recording and reproducing apparatus having a performance far better than that of a conventional recording and reproducing apparatus. But, such an apparatus is required to have a high quality construction and therefore is very expensive. Moreover, it is difficult to maintain good performance for a long time. On the other hand, when the signals converted from a wide band to a narrow band and reproduced from the magnetic disc, similarly as in the signal recording and reproducing apparatus, are transmitted to another magnetic disc of a receiving device at a distance through a transmission line such as a conventional telephone line, it is necessary for the transmitting device to take excess time until the beginning of the recorded signals start to be transmitted in addition to the transmission time of the reproduced signals during one rotation of the magnetic disc. Further, in the receiving device, it is necessary to record the transmitted signals only from the beginning to the end thereof on the other magnetic disc.

FIELD OF THE INVENTION

This invention relates to a signal recording and reproducing apparatus and a signal transmission system, and more particularly to an apparatus for recording the signals reproduced from a magnetic disc on a magnetic tape and a system for transmitting the signals reproduced from a first magnetic disc of a transmitting device to a second magnetic disc of a receiving device through a transmission line.

OBJECTS AND BRIEF SUMMARY OF THE INVENTION

An object of this invention is to provide a signal recording and reproducing apparatus comprising a magnetic disc recorder and a magnetic tape recorder for recording signals previously recorded on a magnetic disc during a low speed rotation of the magnetic disc on a magnetic tape which is moved at a predetermined speed synchronously with the low speed rotation of the magnetic disc by inserting the magnetic tape between a capstan included in the low speed driving means of the magnetic disc recorder and the periphery of the magnetic disc. Another object of this invention is to provide a signal recording and reproducing apparatus for recording wide-frequency band signals such as television video signals on a magnetic disc by a magnetic head during a high speed rotation, for converting from the wide band to a narrow band by changing the rotational speed of the magnetic disc from the high speed to a low speed, and for reproducing from the magnetic disc so as to record the reproduced signals on a magnetic tape which is moved at a predetermined speed synchronously with the low speed rotation of the magnetic disc. A further object of this invention is to provide a signal recording and reproducing apparatus for recording signals previously recorded on a magnetic disc, a magnetic tape by detecting a beginning position on the magnetic disc from which the signals have been recorded, during the reproduction of the recorded signals during the low speed rotation and by gating the reproduced signals during a time period between two successive times corresponding to the detected beginning position.

A still further object of this invention is to provide a signal recording and reproducing apparatus for recording wide-frequency band signals such as television video signals on a magnetic disc from a predetermined position on the magnetic disc during a high speed rotation by controlling the rotational phase of the magnetic disc rotating at the high speed so as to synchronize a pulse signal corresponding to the predetermined position with synchronizing pulses included in the wide-frequency band signals, whereby the signals reproduced from the magnetic disc during the low speed rotation are recorded on the magnetic tape from the beginning of the signals which have been recorded on the magnetic disc, by detecting the predetermined position during the low speed rotation of the magnetic disc and the movement of the magnetic tape.

A still further object of this invention is to provide a signal recording and reproducing apparatus for reproducing signals previously recorded on a magnetic tape during the movement of the magnetic tape and for recording the reproduced signals from the magnetic tape on a magnetic disc which is rotated at low speed synchronously with the movement of the magnetic tape, and then for converting the recorded signals on the magnetic disc from the narrow band into the wide band by changing a rotational speed of the magnetic disc from the low speed rotation to a high speed.

Yet another object of this invention is to provide a signal transmission system comprising a transmitting device and a receiving device which have means included in the signal recording and reproducing apparatus for transmitting signals from the transmitting device to the receiving device through a transmission line by reproducing the signals recorded on a magnetic disc during a low speed rotation of the magnetic disc, and for recording the transmitted signals on a magnetic disc of the receiving device during a low speed rotation of the magnetic disc. Moreover, some further objects are to provide signal transmission systems comprising the means included in the signal recording and reproducing apparatus as described above and having functions corresponding to those of the respective objects.

These objects are achieved by providing a signal recording and reproducing apparatus and a signal transmission signal according to this invention. The signal recording and reproducing apparatus comprises a magnetic disc recorder which includes a magnetic disc, a low speed driving means engageable with the periphery of the magnetic disc for rotation of the magnetic disc at a low speed, and a first narrow band reproducing means including a magnetic head for reproducing signals previously recorded on the magnetic disc during the low speed rotation of the magnetic disc; and a magnetic tape recorder which includes a tape transporting means for moving a magnetic tape at a predetermined speed, and a first narrow band recording means including a recording head for recording the reproduced signals from the magnetic disc through the narrow band reproducing means on the magnetic tape during the movement of the magnetic tape, and the magnetic tape being fed between a capstan included in the low speed driving means and the periphery of the magnetic disc for synchronization of the movement of the magnetic tape with the low speed rotation of the magnetic disc.

The signal transmission system comprises a transmitting device which includes a first magnetic disc, a first low speed driving means for rotating the first magnetic disc at a low speed, a first narrow band reproducing means including a reproducing magnetic head for reproducing signals previously recorded on the first magnetic disc during the low speed rotation of the first magnetic disc, a locating means for locating the first magnetic disc at a position so that a beginning position of the signals previously recorded on the first magnetic disc is coincident with a position of the reproducing magnetic head, and an output means for transmitting the reproduced signals reproduced by the first narrow band reproducing means to a transmission line from the beginning position during one rotation of the first magnetic disc at the low speed; and a receiving device which includes a second magnetic disc, a second low speed driving means for rotating the second magnetic disc at a low speed, a first detecting means for detecting the beginning and the end of the transmitted signals, and a first narrow band recording means including a recording magnetic head for recording the transmitted signals on the second magnetic disc under the control of the first detecting means during the low speed rotation of the second magnetic disc, whereby the transmitting device transmits the reproduced signals to the transmission line as soon as the low speed rotation of the first magnetic disc is started, and the receiving device begins to record the transmitted signals on the second magnetic disc at the detection of the beginning of the transmitted signals and stops recording at the detection of the end of the transmitted signals.

BRIEF DESCRIPTION OF THE DRAWINGS

This invention will be better understood by reference to the following description when considered in connection with the accompanying drawings of illustrative embodiments wherein:

FIGS. 7L–7U are a group of waveforms illustrating the operation of the receiving device shown in FIG. 6;

DETAILED DESCRIPTION OF THE INVENTION

Figure 1:
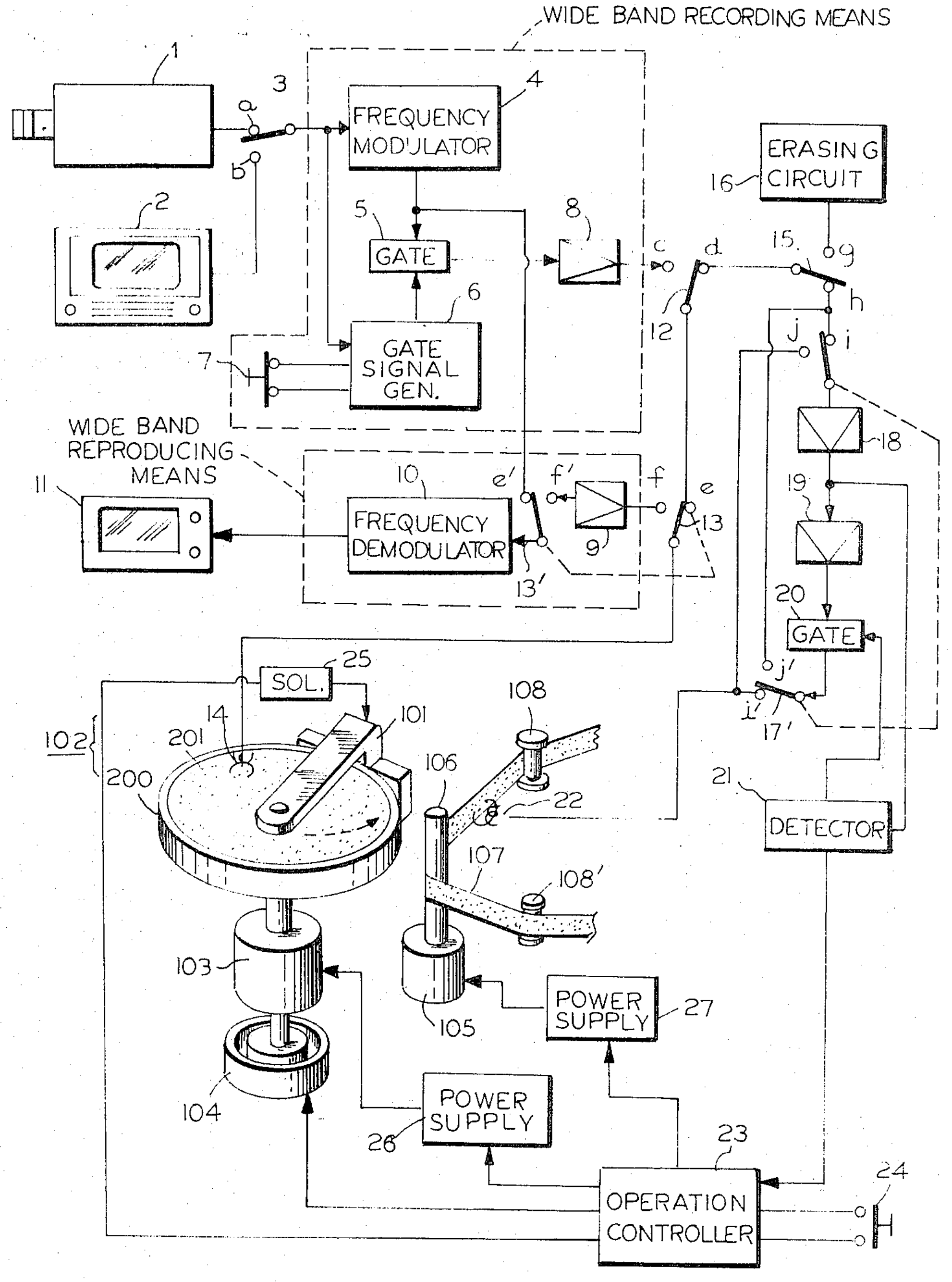
FIG. 1 is a schematic diagram showing an embodiment of the signal recording and reproducing apparatus according to this invention.

In FIG. 1, the construction of an embodiment of a signal recording and reproducing apparatus according to this invention is shown in diagrammatic form.

Input signals for the apparatus are supplied from a television picture camera 1 or a television receiver 2 to the selecting switch 3. A wide band recording means is constructed with a frequency modulator 4, a gate 5 for extracting signals during one field or one frame from wide-frequency band signals, a generator 6 for generating a gate signal, a switch 7 for triggering the generator 6, and a wide band signal recording amplifier 8. Similarly, a wide band reproducing means is constructed with a wide band signal reproducing amplifier 9, and a frequency demodulator 10. A television monitor 11 displays recovered video signals as a still picture. A switch 12 operates to switch the operation mode to either the high speed record pole c or the low speed reproduction pole d. Ganged switches 13 and 13' operate to switch the operation mode to either the high speed record *e,e'* or the high speed reproduction *f,f'*. A magnetic head 14 is provided for recording or reproducing signals on or from the magnetic disc 102. An erasing means is comprised of an erasing circuit 16 and a switch 15 which operates to switch the operation mode to either the low speed reproduction pole h or the erasing pole g. Moreover, a narrow band reproducing means is comprised of a narrow band signal reproducing amplifier 18.

A narrow band recording means comprises a narrow band signal recording amplifier 19, and a gate means comprises a gate 20 for extracting the signals during a period controlled by a gate signal from input signals. A recording head 22 is provided for recording or reproducing signals on or from the magnetic tape 107. A detecting means comprises a detector 21 for detecting a beginning position of recorded signals on the magnetic disc 102 and also generating a gate signal supplied to the gate 20 so as to extract signals during a time period between the time corresponding to the beginning position of the recorded signals and the time corresponding to the beginning position detected by the detector 21.

For controlling the operation, there are an operation controller 23 and a switch 24 for triggering manually the operation controller 23. A solenoid 25 changes the rotating state of the magnetic disc 102 from the high speed to the low speed by being energized from the operation controller 23. Power sources 26 and 27 supply the driving power to a high speed driving motor 103 and a low speed driving motor 105, respectively. A magnetic disc 102 is comprised of a turn table 200, a magnetic sheet 201 mounted on the turn table 200, and a pivotably mounted holding arm 101 on which the turn table 200 including the magnetic sheet 201 is rotatably mounted.

High speed driving means comprises a high speed driving motor 103 for rotating the turn table 200 at a high speed. A brake means 104 is used to stop the rotation of the magnetic disc 102. Further, a low speed driving means comprises a low speed driving motor 105, and a capstan 106 engageable with the periphery of the turn table 200. A tape transporting means is comprised of the capstan 106, and transporting guides 108 and 108'. A magnetic tape 107 is transported by being inserted between the capstan 106 and the periphery of the turn table 200.

In FIGS. 2A–2K signal waveforms for illustrating the operation of some means of the apparatus in FIG. 1 are shown.

Figures 2A, 2B, 2C, 2D, 2E, 2F, 2G, 2H, 2I, 2J, 2K:
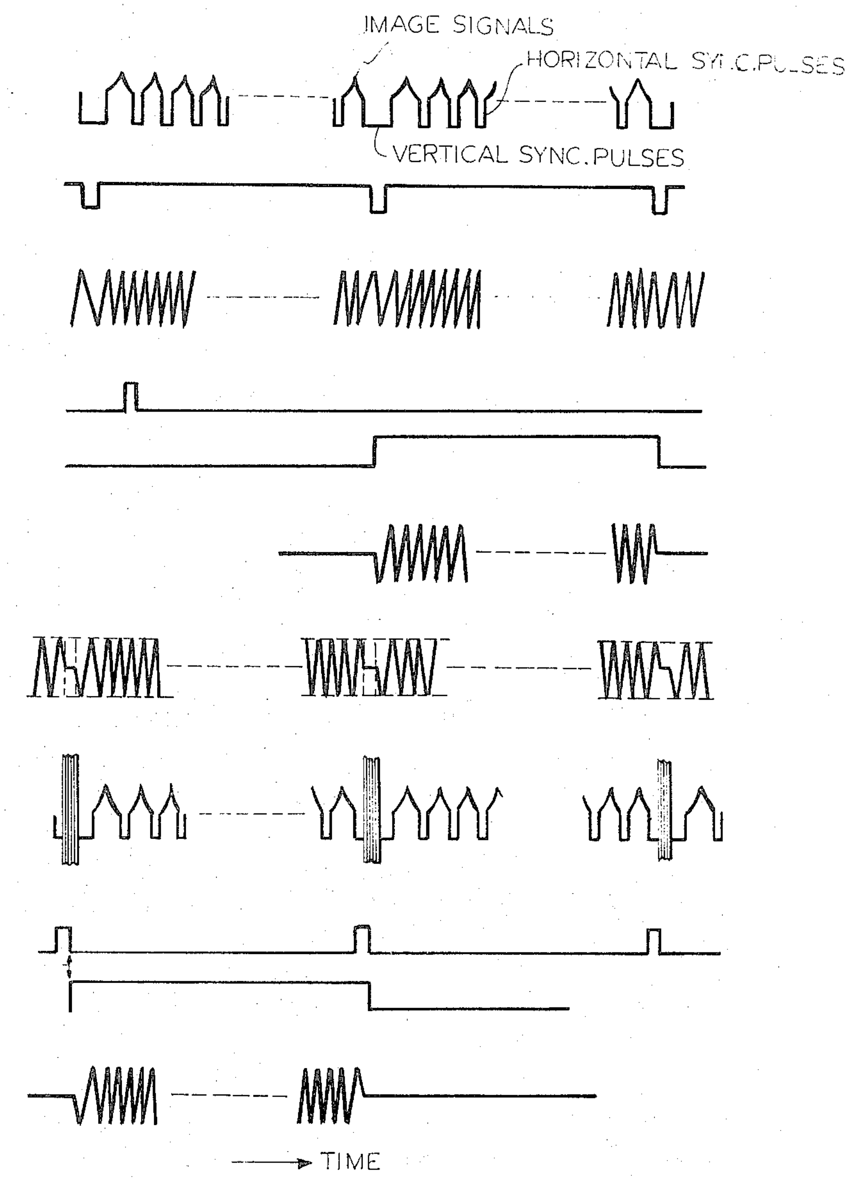
FIGS. 2A–2K are a group of waveforms illustrating the operation of the signal recording and reproducing apparatus shown in FIG. 1.

The waveform of FIG. 2A shows video signals supplied to the apparatus from the television picture camera 1 or the television receiver 2. The waveform of FIG. 2B shows vertical synchronizing pulses separated from video signals by the generator 6. The waveform of FIG. 2C shows frequency modulated signals derived from the frequency modulator 4. The waveform of FIG. 2D shows the triggering pulse generated by the switch 7 for triggering the generator 6. The waveform of FIG. 2E shows the gate signal derived from the generator 6 in response to vertical synchronizing pulses. The waveform of FIG. 2F shows signals extracted during one field or one frame from the frequency modulated signals by the gate 5. The waveform of FIG. 2G shows wide-frequency band signals reproduced from the magnetic disc 102 by the magnetic head 14 durinthe high speed rotation of the magnetic disc 102. The waveform of FIG. 2H shows frequency demodulate signals derived from the frequency demodulator 10. The waveform of FIG. 2I shows pulses corresponding to the duration of the interruption in the signals detected by the detector 21 so as to detect the beginning position of the recorded signals. The waveform of FIG. 2J shows the gate signal supplied to the gate 20 for extracting the signals during one rotation of the magnetic disc 102 from narrow-frequency band signals. Finally, the waveform of FIG. 2K shows signals extracted during one field or one frame from narrow-frequency band signals. The time scale for each of the waveforms shown in FIGS. 2A–2K is a scale suitable for the high speed rotation of the magnetic disc 102.

Referring to FIGS. 1 and 2, the operation of the signal recording and reproducing apparatus according to an embodiment of the invention is described in the following. Video signals from the television picture camera 1 or the television receiver 2 through the position *a* or the position *b* of the switch 3 are supplied to the frequency modulator 4 and to the generator 6. Video signals include image signals, horizontal synchronizing pulses, and vertical synchronizing pulses as shown in FIG. 2A. Frequency modulated signals are derived from the frequency modulator 4 in which the carrier signals are frequency modulated by supplied video signals, as shown in FIG. 2C.

On the other hand, vertical synchronizing pulses are separated from video signals supplied to the generator 6 as shown in FIG. 2B, and are employed for generating the gate signal. On the other hand, when the switch 7 is pushed manually, a triggering pulse for extracting the signals during one field or one frame from the frequency modulated signals is generated as shown in FIG. 2D, and is supplied to the generator 6.

Hereupon, a gate signal corresponding to one time period between pulses (during one field) or two time periods (during one frame) following the triggering pulse is generaged by the generator 6, as shown in FIG. 2E and is fed to the gate 5. The gate 5 is opened to pass signals during when the gate signal is being applied thereto from the generator 6. Output signals derived from the gate 5 have the waveform shown in FIG. 2F and are fed to the wide band signal recording amplifier 8.

Therefore, the recording current flows through the pole C of the switch 12 and the pole *e* of the switch 13 to the magnetic head 14, so that wide-frequency band signals are recorded on the magnetic disc 102 during one rotation. As described above, wide-frequency band signals frequency modulated by the video signals are recorded on the magnetic disc 102.

The rotation of the magnetic disc 102 should be set to 3,600 rpm when video signals based on NTSC standard during one field are recorded on the magnetic disc 102, and to 1,800 γpm when the video signals during one frame are recorded. The high speed rotation of the magnetic disc 102 is performed by the driving motor directly coupled to the magnetic disc 102 so as to add the inertia of the magnetic disc 102 to that of the motor 103, whereby the irregularity of the rotational speed and the variation of the rotational torque caused by the driving motor 103 are improved as compared with that of the motor 103 alone.

Accordingly, when the magnetic disc 102 is rotated by the capstan 106 at the low speed, the driving power applied from the driving source 26 to the driving motor 103 is cut off because of the removal of the reaction torque produced from the driving motor 103, for which it is preferred to employ a motor such as an alternating current induction motor, a direct current brushless winding motor, or the like.

The operation of the high speed reproduction is as follows; wide-frequency band signals recorded on the magnetic disc 102 are reproduced by the magnetic head 14 during the high speed rotation of magnetic disc 102, and are are supplied to the wide band signal reproducing amplifier 9 through the pole *f* of the switch 13. The waveform of output signals derived from the amplifier 9 has the duration of the interruption in the signals, that is the pause between the beginning and the end of signals recorded on the magnetic disc 102. as shown in FIG. 2G.

Video signals are repeated each time the disc 102 is rotated and are recovered by the frequency demodulator 10 to which the reproduced signals are supplied through the pole *f'* of the switch 13'. The waveform of the demodulated video signals is shown in FIG. 2H. Finally, the video signals are displayed on the television monitor 11 as a still picture. The noise existing in the video signals shown in FIG. 2H is produced by the frequency demodulator 10 as the large demodulated noise at the interruption duration of the wide-frequency band signals. But, when it disturbs the the picture on the television monitor 11, the noise is easily removed by using a gate.

The following description is of the reproduction of signals recorded on the magnetic dics 102 for recording the signals on the magnetic tape 107 during the low speed rotation of the magnetic disc 102.

The driving power applied from the driving source 26 to the high speed driving motor 103 is cut off, and the magnetic disc 102 is braked to stop the high speed rotation by braking means 104. Further, the holding arm 101 on which the turn table 200 including the magnetic sheet 201 is rotatably mounted is moved in the direction shown by the dashed arrow in FIG. 1 by energizating the solenoid 25, so that the rotation of the magnetic disc 102 is changed from the high speed to a low speed and the disc 102 is rotated at the periphery by the capstan 106 at the low speed.

Elastic material is provided on the periphery of the turn table 200 so as to prevent slippage between the capstan 106 and the periphery of the turn table 200. By inserting the magnetic table 107 between the capstan 106 and the periphery of the turn table 200, the magnetic tape 107 is moved at a predetermined speed synchronously with the low speed rotation of the magnetic disc 102.

When switches 12 and 15 are turned to the poles *d* and *h* respectively and switches 17 and 17' are turned to poles *i* and *i'*, narrow-frequency band signals reproduced by the magnetic head 14 are supplied to the narrow band signal reproducing amplifier 18. Output signals derived from the amplifier 18 are fed to the narrow band signal recording amplifier 19 by which the signals are amplified for recording on the magnetic tape 107. The waveform of signals derived from the narrow band signal reproducing amplifier 18 is shown in FIG. 2G the only difference compared to the waveform of signals reproduced from magnetic disc 102 during the high speed rotation being a difference of the time scale. Output signals of the narrow band signal reproducing amplifier 18 are supplied to the detector 21, and the beginning position of the recorded signals on the magnetic disc 102 are detected by means of the detection of the duration of the interruption or the noise in the pause of signals, as shown in FIG. 2I.

The low speed rotation of the magnetic disc 102 is stopped at once by deenergizing the solenoid 25 so as to remove the magnetic disc 102 from the capstan 106 in response to an output signal corresponding to the beginning position detected by the detector 21 through the operation controller 23, whereby the operation for locating the magnetic dics 102 at a position at which the signals are recorded, at the position of the magnetic head 14 is accomplished.

The above-described operation is controlled as follows. When the switch 24 is pushed manually, a pulse for triggering the operation controller 23 is generated so that the low speed rotation of the magnetic disc 102 is started, and at the same time the movement of the magnetic tape 107 is started synchronously with the rotation of the magnetic disc 102 by energizing the solenoid 25 through the operation controller 23.

On the other hand, the gate 20 is opened to pass signals by having applied thereto the gate signal shown in FIG. 2J from the detector 21 as soon as the low speed rotation of the magnetic disc 102 and the transportation of the magnetic tape 107 are started. Thus, narrow-frequency band signals extracted during one rotation of the magnetic disc 102 by the gate 20 are fed to the magnetic head 22 through the pole *i'* of the switch 17' and are recorded on the magnetic tape 107.

When the interruptions of the signals are detected two times by the detector 21 after starting the low speed rotation of the magnetic disc 102, the gate 20 is closed to shut off signals in response to the gate signal generated by the detector 21, so that narrow-frequency band signals are recorded onto the magnetic tape 107 by the recording head 22 during one rotation of the magnetic disc 102, that is the signals during one field or one frame, as shown in FIG. 2K. The low speed rotation of the magnetic disc 102 and the movement of the magnetic tape 107 are stopped by deenergizing the solenoid 25 through the operation controller 23 which is triggered by the detected pulse derived from the detector 21.

There will now be described the operation of recording the narrow-frequency band signals from the magnetic tape 107 on the magnetic disc 102 during low speed rotation of the magnetic disc 102 and movement of the magnetic tape 107. Signals recorded on the magnetic disc 102 are erased by feeding an erasing current from the erasing circuit 16 to the magnetic head 14 through the pole of the switch 15, the pole *d* of the switch 12, and the pole *e* of the switch 13. Then, the switch 15 is returned to the pole h, and switches 17 and 17' are turned to poles *j* and *j'*, respectively.

The low speed rotation of the magnetic disc 102, and at the same time the movement of the magnetic tape 107 are started by energizing the solenoid 25 for moving the holding arm 101 in the direction shown by dashed arrow in FIG. 1, so that the magnetic disc 102 is rotated at the low speed and the magnetic tape 107 is moved by being inserted between the capstan and the periphery of the magnetic disc 102. The signals reproduced from the magnetic tape 107 by the recording head 22 are supplied to the magnetic head 14 through the pole *j* of the switch 17, the narrow band signal reproducing amplifier 18 for amplifying the signals, the narrow band signal recording amplifier 19 for amplifying the signals derived from the narrow band signal reproducing amplifier 18, the gate 20 for extracting the signals in response to the gate signal, the pole *j'* of the switch 17', and poles *h*, *d* and *e* of switches 15, 12 and 13.

Output signals of the narrow band signal reproducing amplifier 18 are fed to the detector 21, by which the beginning and the end of recorded signals on the magnetic tape 107 is detected and the gate signal to be supplied to the gate 20 is generated. The gate 20 is opened to pass signals in response to the gate signal generated by the detector 21 which detects the beginning of the signals. When the end of the signals is detected by the detector 21, the gate 20 is closed to block further signals in response to the gate signal generated by the detector 21.

The low speed rotation of the magnetic disc 102 and the movement of the magnetic tape 107 are stopped by deenergizing the solenoid 25 through the operation controller 23 which is triggered by the detection pulse indicating the end of the signals from the detector 21. Thus, narrow-frequency band signals reproduced from the magnetic tape 107 are recorded on the magnetic disc 102 during the low speed rotation of the magnetic disc 102 and the movement of the magnetic tape 107. Thereafter, wide-frequency band signals are reproduced from the magnetic disc 102 by the magnetic head 14 by changing the speed of rotation of the magnetic disc 102 from the low speed to the high speed, and video signals which are displayed as a still picture on the television monitor 11 are recovered by the same operation as for the high speed reproduction described above.

By always supplying the driving power from the driving source 27 to the low speed driving motor 105, the time necessary to bring the magnetic disc up to the low speed of rotation can be kept short. Because the magnetic disc 102 has a large diameter and is driven at the periphery which is engageable with the capstan 106, the fluctuation of the rotating speed is reduced by employing only the capstan.

The high speed driving motor 103 directly coupled to the magnetic disc 102 can be replaced by a driving capstan engageable with the periphery of magnetic disc 102 and the low speed driving motor 105 directly coupled to the capstan 106 can be replaced by a motor and a belt.

On the other hand, the low speed rotation of the magnetic disc 102 and the movement of the magnetic tape 107 are carried out by using the capstan 106 for common driving means, so that the irregularity of the rotational speed of the capstan 106 and the driving motor 105 is eliminated because the rotational speed of the magnetic disc 102 varies synchronously with the moving speed of the magnetic tape 107. Accordingly, without controlling the rotational speed or the moving speed, the ratio of the low speed rotation of the magnetic disc 102 to the moving speed of the magnetic tape 107 can be completely constant, and video signals having no variation in frequency are recovered with the simple construction of the low speed driving mechanism. And also, video signals are recovered by the apparatus from the magnetic tape on which narrow-frequency band signals are previously recorded by another magnetic tape moving device having a high quality performance.

The magnetic tape on which narrow-frequency band signals are recorded by the apparatus, can be duplicated by a conventional duplicator employed for the duplication of magnetic tape.

Moreover, by employing a single magnetic head 14 engageable with the magnetic disc 102 for recording or reproducing signals during the high speed rotation and for recording, reproducing or erasing signals during the low speed rotation, the magnetic head 14 is easily set up relative to the magnetic disc 102 and also it is easily replaced with a new magnetic head.

Signals are recorded on the magnetic disc 102 by the magnetic head 14 in a circular recording track. The magnetic disc 102 has a plurality of circular recording tracks thereon, and the magnetic head 14 scans one of the circular recording tracks on which the recording, reproduction and erasure of signals are repeatedly carried out. Therefore, the position of the magnetic head 14 can be changed to the position of another one of the circular recording tracks by a track change means (not shown) for changing the position which the magnetic head 14 occupies, when the signal recording or reproducing performance changes for the worse.

Moreover, the contact of the magnetic head 14 with the magnetic sheet 201 is stable when a single magnetic head 14 is employed for recording or reproducing signals at the high speed rotation and the low speed rotation of the magnetic disc 102, and much wear of the magnetic sheet 201 does not occur, for example, until after more than two hundreds hours with each of circular recording tracks on the magnetic sheet 201.

The only difficulty is the derivation of a very low voltage from the magnetic head 14 at the low speed rotation of the magnetic disc 102, because the converting ratio of the high speed rotation to the low speed rotation is increased from one five hundredth to one two thousandth. But, this difficulty is overcome by employing a voltage step up transformer with very large ratio, for example a ratio of more than six hundred. By employing such a transformer, the signal to noise ratio having values more than 35dB is achieved at the low speed reproduction.

The converting ratio of the rotational speed of the magnetic disc can be arbitrarily determined for the apparatus. The magnetic disc for recording or reproducing signals at the high speed rotation or the low speed rotation can be replaced by a recording medium such as a magnetic drum, a metal coated magnetic disc, or the like. Switches 12, 13, 13', 15, 17 and 17' are turned to specified positions automatically according to the operation sequence determined by the operation controller 23.

Figure 3:
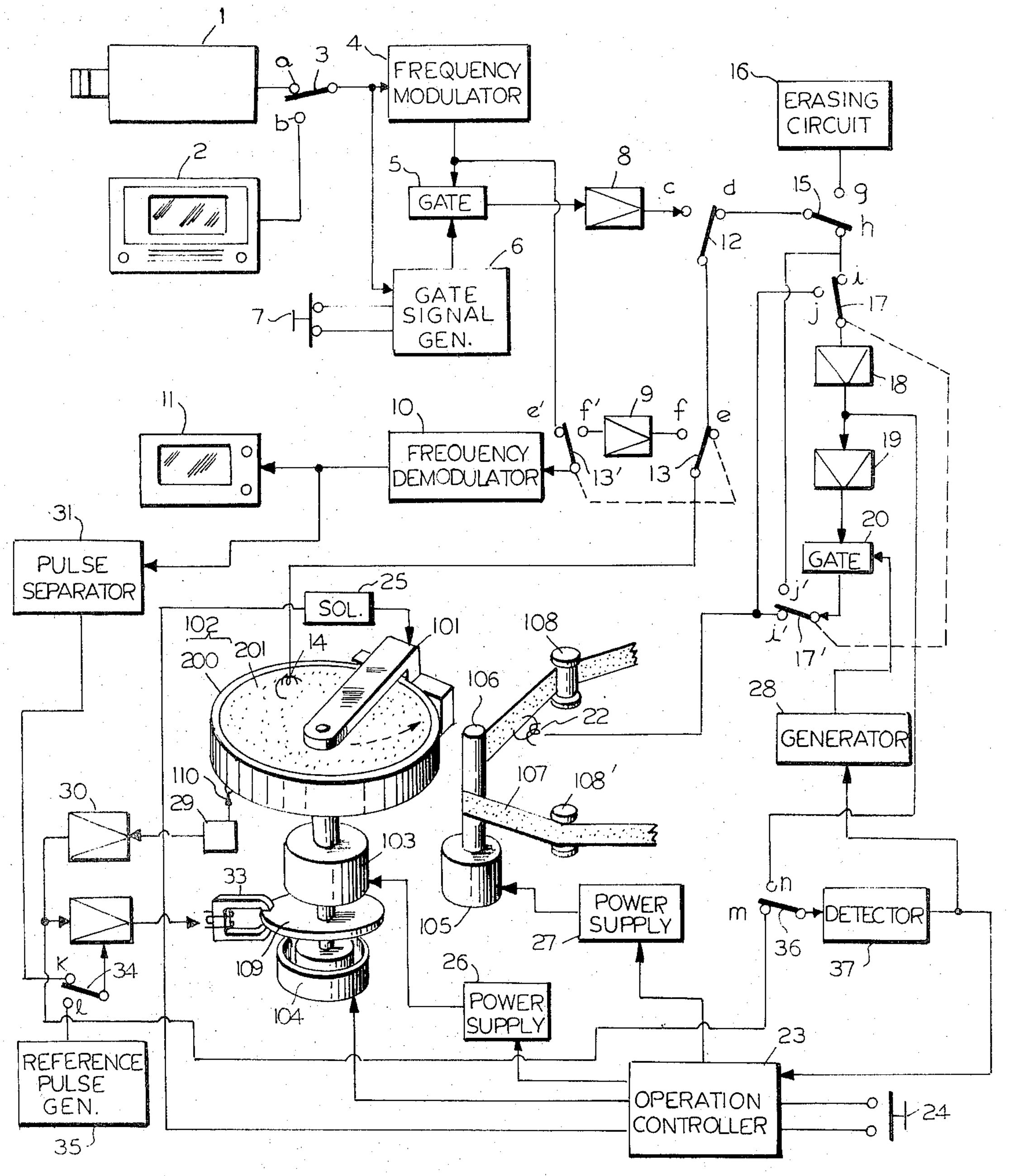
FIG. 3 is a schematic diagram showing another embodiment of the signal recording and reproducing apparatus according to this invention.

The construction of another embodiment of a signal recording and reproducing apparatus according to this invention is shown in FIG. 3.

The main means, such as the magnetic disc, the record reproducing amplifier for signals and the driving means for the magnetic disc or the magnetic tape, of the apparatus are the same to those as shown in FIG. 1. Differences in the operation are as follows.

First, when wide-frequency band signals are recorded on the magnetic disc 102 during the high speed rotation, the rotational phase of the magnetic disc 102 is controlled by braking the high speed rotation of the magnetic disc 102 with an electric brake, such as an eddy current brake, for synchronizing a pulse signal corresponding to a predetermined position on the magnetic disc 102 with vertical synchronizing pulses separated from the wide band video signals, so that the wide-frequency band signals are recorded on the magnetic disc 102 from the predetermined position.

Second, when wide-frequency band signals are reproduced from the magnetic disc 102 during the high speed rotation, the rotational phase of the magnetic disc 102 is controlled for synchronizing the pulse signal corresponding to the predetermined position with reference pulses, so that the frequency of vertical synchronizing pulses included in the signals which are to be reproduced from the magnetic disc 102 is caused to fall into the vertical scanning frequency of the television receiver for displaying the picture.

Third, the gate signal for extracting signals during one rotation of the magnetic disc 102 is generated in response to a pulse signal corresponding to the predetermined position on the magnetic disc 102.

The apparatus shown in FIG. 3 further includes the following means. A detecting means is comprised of a detector 37 for detecting a predetermined position 110 on the magnetic disc 102 or detecting the beginning and the end of signals derived from the narrow band signal reproducing amplifier 18, a switch 36 for selecting input signals to the detector 37, and a generator 28 for generating a gate signal to extract signals during one field or one frame in response to the pulse detected by the detector 37.

A control means is comprised of a predetermined position indicator indicating the position 110 located on the magnetic disc 102, a position detector 29 for generating a pulse signal upon detecting the predetermined position 110 during the rotation of the magnetic disc 102, a pulse amplifier 30 for amplifying the pulse signal generated by the position detector 29, a pulse separator 31 for separating vertical synchronizing pulses from video signals, a rotational phase controller 32 for controlling to synchronize the pulse signal with the vertical synchronizing pulses or reference pulses, an eddy current braking magnet 33, an eddy current braking disc 109, a switch 34 for selecting the input pulse to the controller 32, and a reference pulse generator 35.

Now referring to FIG. 3, the operation of the apparatus due to the different means from that in the construction shown in FIG. 1 will be described. When wide-frequency band signals are recorded on the magnetic disc 102 during the high speed rotation, vertical synchronizing pulses are separated from output signals of the frequency demodulator 10, and are fed to the rotational phase controller 32 through the pole K of the switch 34 as one of input signals.

On the other hand, the position detector 29 generates a pulse signal by detecting the predetermined position 110 on the magnetic disc 102. The generated pulse signal is amplified by the pulse amplifier 30 and is supplied to the rotational phase controller 32 as the other of the input signals.

An alternating current induction motor having two poles is employed for the high speed driving motor 103, and is rotated by supplying a driving power the frequency of which is a little higher than 60Hz, from the driving source 26 when recording video signals based on the NTSC standard during one field. An output voltage proportional to the phase difference between vertical synchronizing pulses and the pulse signal corresponding to the predeternined position 110 is obtained from the rotational phase controller 32.

The output voltage derived from the rotational phase controller 32 is fed to the eddy current braking magnet 33, which brakes the high speed rotation of the magnetic disc 102, engageable with the eddy current braking disc 109, so that the rotational phase of the high speed rotation of the magnetic disc 102 is controlled to synchronize the pulse signal corresponding to the predetermined position 110 with vertical synchronizing pulses included in the video signals.

Accordingly, the wide-frequency band signals extracted during one field are recorded by the magnetic head 14 on the magnetic disc 102 from the predetermined position 110 when the switch 7 for triggering the generator 6 is pushed.

In the operation of the high speed reproduction, reference pulses are applied from the reference pulse generator 35 to the rotational phase controller 32 through the pole l of the switch 34, and the rotational phase of the magnetic disc 102 is controlled to synchronize the pulse signal corresponding to the predetermined position 110 with the frequency of the reference pulses.

By the operation described above, even if the frequency of the vertical synchronizing pulses included in video signals from the television picture camera 1 is shifted from the normal field frequency 60Hz, the rotational phase of the high speed rotation of the magnetic disc 102 is controlled to follow in accordance with the field frequency of the input video signals. Therefore, the wide-frequency band signals are recorded on the magnetic disc 102 so that there is no shift between the beginning position of wide-frequency band signals to be recorded and the predetermined position 110 on the magnetic disc 102. Thus, the recorded signals are reproduced to syncrhonize the vertical synchronizing pulses with the reference pulses completely. During, the operation of the low speed reproduction, the pulse signal corresponding to the predetermined position 110 on the magnetic disc 102 is supplied to the detector 37 through the pulse amplifier 30 and the pole *m* of the switch 36.

The low speed rotation of the magnitude disc 102 is stopped once by the operation controller 23 which is triggered by the output pulse derived from the detector 37, and then by pushing the switch 24, the low speed rotation of the magnetic disc 102 is started again by energizing the solenoid 25 through the operation controller 23.

On the other hand, a gate signal corresponding to one rotation of the magnetic disc 102 is generated by the generator 28 in response to the output signal derived from the detector 37, and is fed to the gate 20. Thus, the narrow-frequency band signals are recorded on the magnetic tape 107 during one rotation of the magnetic disc 102.

During the operation of reproducing narrow-frequency band signals from the magnetic tape 107 for recording the signals on the magnetic disc 102, output signals from the narrow band signal reproducing amplifier 18 are supplied to the detector 37, which detects the beginning and the end of the signals reproduced from the magnetic tape 107, through the pole *n* of the switch 36. The gate signal is generated by the generator 28 in response to the pulse corresponding to the beginning position of the recorded signals detected by the detector 37, and is fed to the gate 20, so that narrow-frequency band signals are recorded on the magnetic disc 102 during a time period from the beginning to the end of the signals during the low speed rotation of the magnetic disc 102 and the movement of the magnetic tape 107.

The rotational phase control of the magnetic disc 102 can be performed without employing the eddy current brake means by changing the frequency of the driving power from the driving power supply 26 with respect to the output voltage proportional to the phase difference between vertical synchronizing pulses and the pulse signal corresponding to the predetermined position 110. The tape transporting means which moves the magnetic tape 107 by the same capstan that drives the magnetic disc 102, can be replaced by a conventional tape recorder which carries out tape movement well.

The above descriptions are for the signals which are frequency modulated by the video signals for forming wide-frequency band signals, but without restricting the application, the speed converting recording and reproduction of signals can be carried out by supplying arbitrary wide band signals during the high speed rotation or narrow band signals during the low speed rotation to the signal recording and reproducing apparatus.

Figure 4:
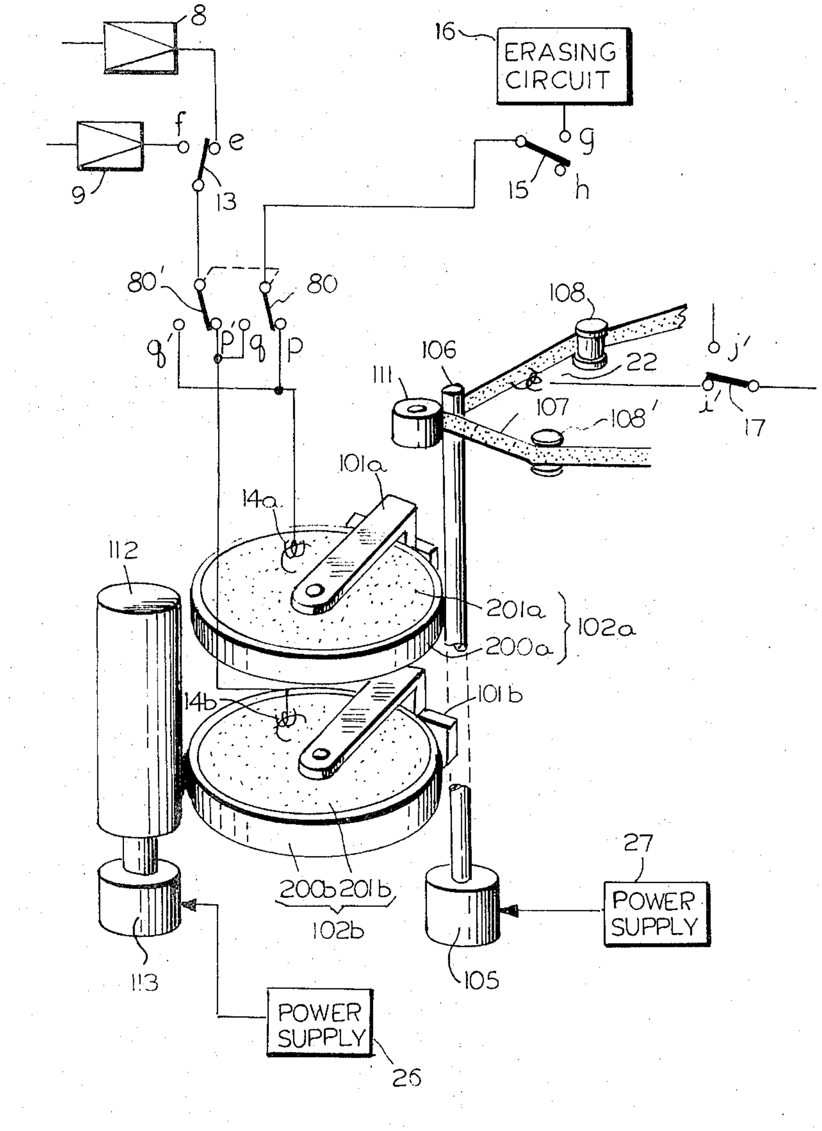
FIG. 4 is a schematic diagram showing another type of embodiment of the signal recording and reproducing apparatus according to this invention, wherein two magnetic discs are used for alternately and successively reproducing wide-frequency band signals.

The successive operation of speed converting record reproduction of recorded signals to a still picture by the apparatus according to the invention is achieved by employing two magnetic discs 102*a* and 102*b* comprised of two turn tables 200*a* and 200*b* including two magnetic sheets 201*a* and 201*b*, as shown in FIG. 4. The rotation modes of the two magnetic discs 102*a* and 102*b* are alternately changed in such a way that one of the magnetic discs is being rotated at the low speed by a low speed driving capstan 106 so as to record thereon the signals reproduced from the magnetic tape 107 while the other of the magnetic discs is being rotated at the high speed by a high speed driving capstan 112 so as to reproduce wide-frequency band signals.

A converting means is constructed with two pivotable holding arms 101*a* and 101*b* on which respective turn tables 200*a* and 200*b* including magnetic sheets 201*a*and 201*b* are rotatably mounted, respectively.

In FIG. 4, narrow-frequency band signals reproduced from the magnetic tape 107 are recorded on the magnetic disc 102*a* by the magnetic head 14*a* through the pole *p* of the switch 80 during the low speed rotation of the magnetic disc 102*a* by the low speed driving capstan 106 engageable with the peripheries of the magnetic discs and the movement of the magnetic tape 107, which is moved synchronously with the low speed rotation of the magnetic disc 102*a* by inserting the magnetic tape 107 between the capstan 106 and a pinch roller 111.

At the same time, wide-frequency band signals, which have previously been reproduced from the magnetic tape 107 and recorded on the magnetic disc 102*b*, are reproduced by the magnetic head 14*b* during the high speed rotation of the magnetic disc 102*b* when the periphery of magnetic disc 102*b* is engaged with the high speed driving capstan 112 and are fed to the wide band signal reproducing amplifier 9 through the pole *p* of the switch 80'. The high speed driving capstan 112 is directly coupled to the high speed driving motor 113 which is rotated continuously by driving power from the driving power supply 26.

The magnetic head 14a is connected to the narrow band recording or reproducing circuit through the pole p of the switch 80 and the magnetic head 14b is connected to the wide band recording or reproducing circuit through the pole *p'* of the switch 80'. These switches 80 and 80' are turned at the same time to interchange the high speed rotation and the low speed rotation of two magnetic discs 102*a* and 102*b*, and thus the connection of the magnetic head 14*a* to the narrow band recording circuit and the magnetic head 14*b* to the wide band reproducing circuit are interchanged with each other. By changing alternately the rotation mode of the two magnetic discs 102*a* and 102*b*, as described above, the signals recorded alternately from the magnetic tape 107 on either of magnetic discs 102*a* and 102*b* are successively reproduced from both magnetic discs for displaying the still picture on the television receiver.

By employing the signal recording and reproducing apparatus described above, a signal transmission system can be constructed with a few modifications. The transmission of signals through a conventional telephone line is performed by the signal transmission system according to this invention as follows; in the transmitting device, wide-frequency band signals are recorded on a magnetic disc by the magnetic head during the high speed rotation of the magnetic dics; such recorded signals are converted from the wide-frequency band signals to narrow-frequency band signals by changing the rotational speed of the magnetic disc from the high speed to the low speed, and are reproduced from the magnetic disc and then are transmitted through the transmission line to the receiving device which is at a distance; in the receiving device, the transmitted signals are recorded on a magnetic disc by the magnetic head during the low speed rotation of the magnetic disc, and are converted from narrow-frequency band signals to wide-frequency band signals by changing the rotational speed of the magnetic disc from the low speed to the high speed and are reproduced from the magnetic disc.

Figure 5:
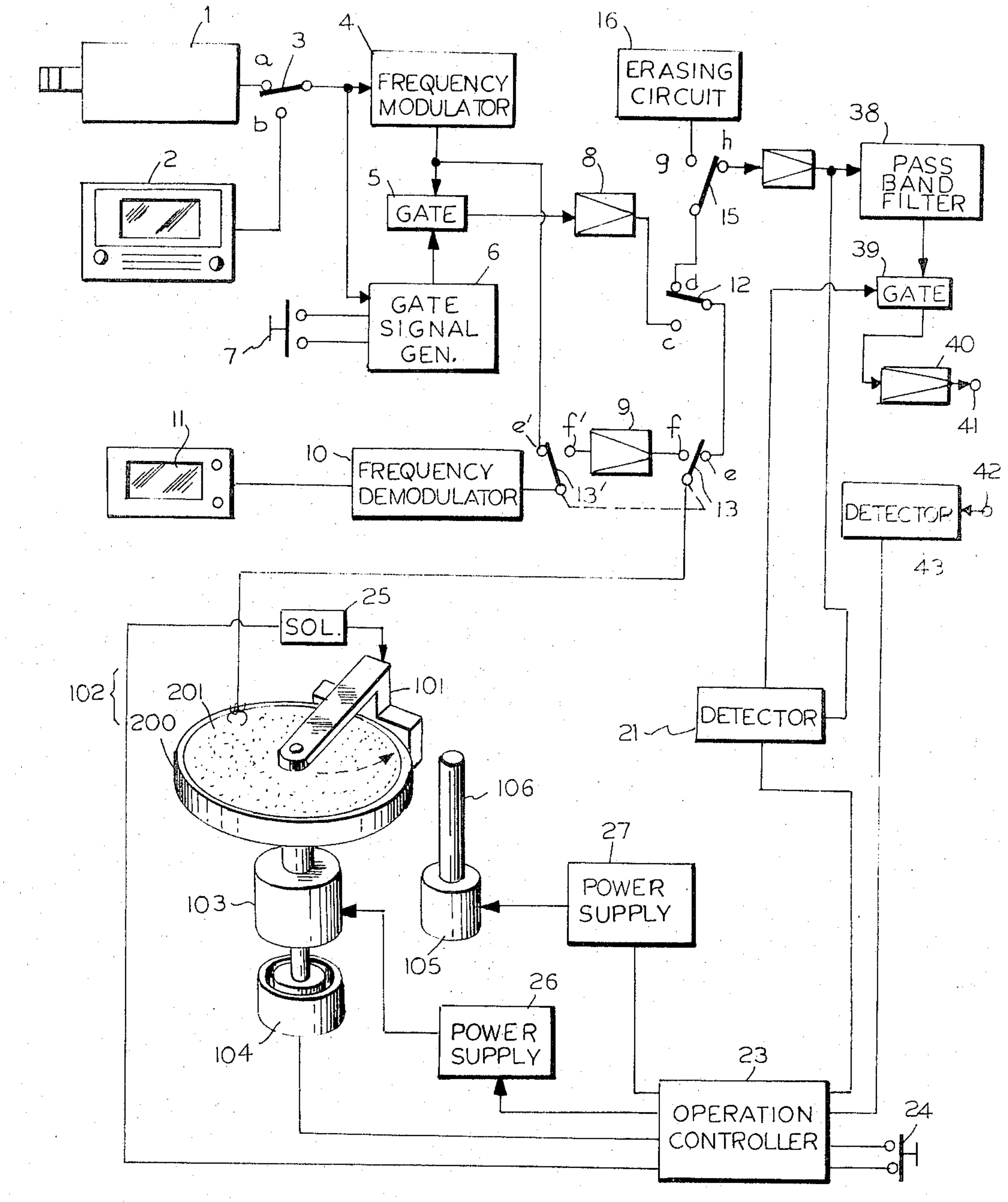
FIG. 5 is a schematic diagram showing an embodiment of the transmitting device of the signal transmission system according to this invention.

In FIG. 5, the construction of a transmitting device of a signal transmission according to this invention is shown. The main means of this system are the same as shown in FIG. 1. In the construction of this device as compared to the apparatus shown in FIG. 1, the magnetic tape 107, tape transporting guides 108 and 108' in the tape transporting means, the tape recording head 22, and switches 17 and 17' are omitted. The narrow band recording means for the magnetic tape 107 is replaced by an output means which includes a detector 21 for detecting the beginning position of recorded signals, a band pass filter 38, a gate 39 for extracting the signals from input signals during a time period controlled by the gate signal, a transmitting amplifier 40 for transmitting signals from the gate 39 to the transmission line, and an output terminal 41 for sending out the signals. In addition, for controlling the operation, there are an input terminal 42 for marker signals for triggering the operation of the transmitting device, and a detector 43 for detecting the marker signals. The operation of the transmitting device is described mainly with respect to these elements.

Narrow-frequency band signals reproduced from the magnetic disc 102 by the magnetic head 14 are supplied to the narrow band signal reproducing amplifier 18 through the pole *e* of the switch 13, the pole *d* of the switch 12, and the pole *h* of the switch 15, and then the reproduced signals are filtered for the bandwidth required to be transmitted through the transmission line by the bandpass filter 38. Output signals from the narrow band signal amplifier 18 are supplied to the detector 21 which detects a beginning position of the signals recorded on the magnetic disc 102 by means of the detection of the interruption or the noise in the pause of the signals.

The low speed rotation of the magnetic disc 102 is stopped once by deenergizing the solenoid 25 so as to remove the periphery of the magnetic disc 102 away from the capstan 106 in response to the pulse corresponding to the beginning position detected by the detector 21, whereby the operation for locating the magnetic disc 102 at a position so that the beginning position of the recorded signals is coincident with the position of the magnetic head 14 is accomplished.

On the other hand, when the switch 24 is pushed manually, a pulse for triggering the operation controller 23 is generated so that the low speed rotation of the magnetic disc 102 is started again by energizing the solenoid 25 through the operation controller 23. At the same time, the gate 39 is opened to pass signals by being provided with a gate signal from the detector 36 as soon as the low speed rotation of the magnetic disc 102 is started. Thus, narrow-frequency band signals passing the gate 39 are fed to the transmitting amplifier 40 and are transmitted through the output terminal 41 to the transmission line.

When the interruption in the narrow-frequency band signals is detected by the detector 36 after a period of time after starting the low speed rotation of the magnetic disc 102, the gate 39 is closed to shut signals in response to the gate signal generated by the detector 36, so that the narrow-frequency band signals are transmitted to the transmission line during one rotation of the magnetic disc 102, that is signals during one field or one frame. The low speed rotation of the magnetic disc 102 is stopped by deenergizing the solenoid 25 through the operation controller 23 which is triggered by the pulse corresponding to the beginning position detected by the detector 21.

By the operation described above, the transmission of narrow-frequency band signals during one field or one frame is performed. Then, signals recorded on the magnetic disc 102 is erased, as described in connection with FIG. 1, and the succeeding signals can be recorded on the magnetic disc 102 during high speed rotation. The operation of transmitting signals to the transmission line can be started through the operation controller 23 which is triggered by a detected signal derived from the detector 43 to which the marker signal transmitted from the receiving device is supplied through the input terminal 42.

Figure 6:
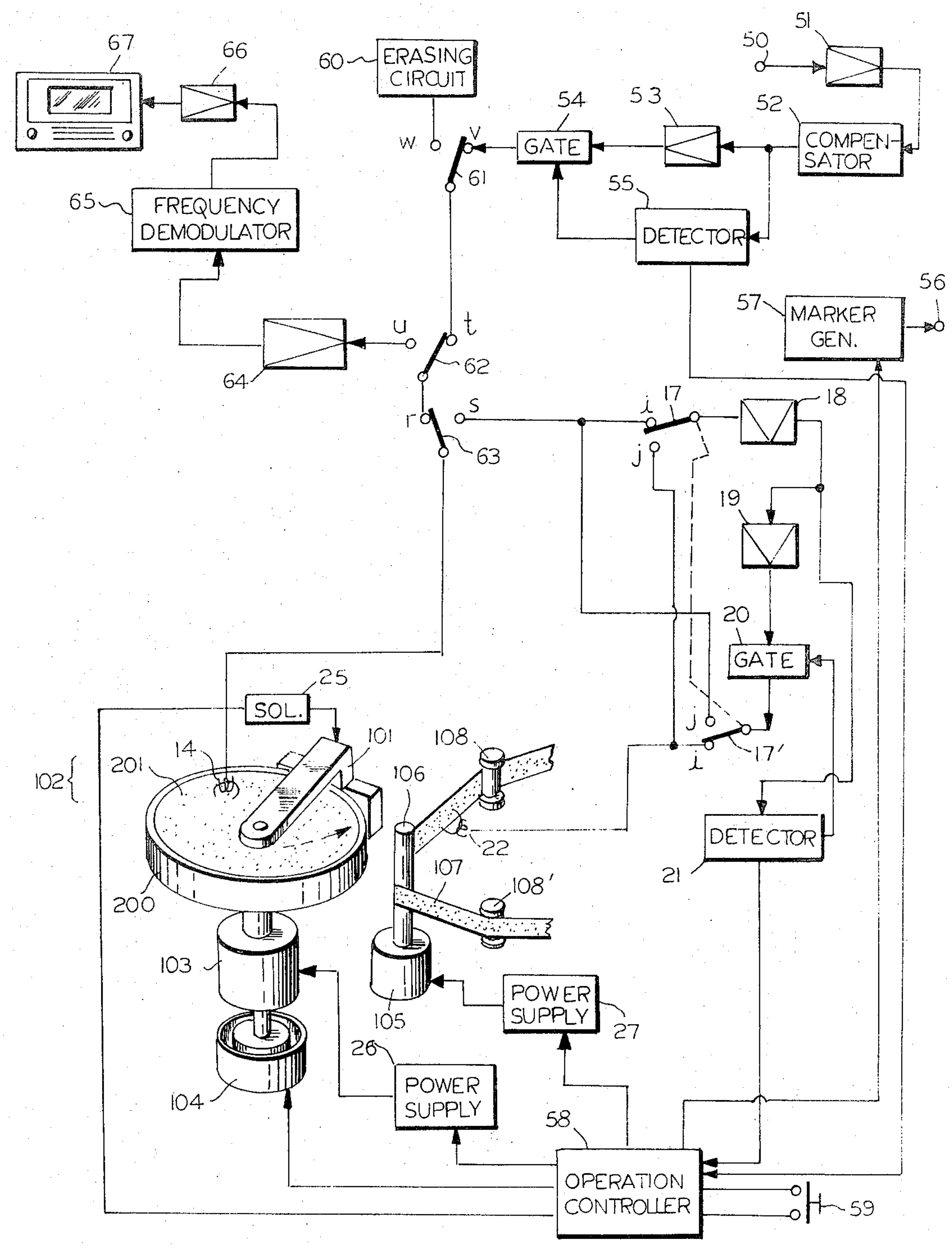
FIG. 6 is a schematic diagram showing an embodiment of the receiving device of the signal transmission system according to this invention.

Referring to FIG. 6, the construction of a receiving device for the signal transmission system according to this invention will be described. The main means such as the magnetic disc, the driving means for the magnetic disc, the reproducing amplifier for recorded signals and the driving means for the magnetic disc and the magnetic tape of this device are the same as those shown in FIG. 1.

In FIG. 6, the signal receiving means comprises an input terminal 50 for receiving signals from the transmission line, a receiving amplifier 51 for amplifying the transmitted signals, and a compensator 52 for compensating for the amplitude and the phase characteristics of the transmission line. A narrow band recording means is comprised of a narrow band signal recording amplifier 53, and a gate 54 for extracting signals during the period of the beginning to the end from the transmitted signals. A detecting means is comprised of a detector 55 for detecting the beginning and the end of the transmitted signals.

For controlling the operation, there are an output terminal 56 for the marker signal for triggering the operation of the transmitting device, a marker generator 57, an operation controller 58, and a switch 59 for triggering manually the operation controller 58. An erasing means is comprised of an erasing circuit 60 and a switch 61 for switching to the pole *v* for the low speed recording or the pole *w* for the erasing. Switch 62 operates to switch the operation mode to either the low speed recording pole *t* or high speed reproduction pole *u* and a switch 63 operates to switch the operation mode to either the magnetic disc reproduction pole *r* or the magnetic tape reproduction pole *s*. Further, a wide band reproducing means is constructed with a wide band signal reproducing amplifier 64, a frequency demodulator 65, and a video signal amplifier 66. A television receiver 67 displays the recovered video signals as a still picture.

A tape transporting means for the magnetic tape 107, narrow band reproducing means for the magnetic disc 102 or the magnetic tape 107, narrow band recording means for the magnetic tape 107 or the magnetic disc 102, a detecting means 21, the second magnetic head 22, and switches 17 and 17' are the same as already described in connection with FIG. 1. Likewise the magnetic disc, a low speed driving means, a high speed driving means, and driving power supplies for them are the same as those shown in FIG. 1 and are indicated by the same reference numerals.

In FIG. 7, signal waveforms illustrating the operation of some means of the receiving device in FIG. 6 are shown. The waveform of FIG. 7L shows the signals transmitted to the input terminal 50 containing the noise of the transmission line. The waveform of FIG. 7M shows the pulses for detecting the beginning and the end of transmitted signals by the detector 55. The waveform of FIG. 7N shows the gate signal supplied to the gate 54 for extracting the signals during the period from the beginning to the end of the transmitted signals. The waveform of FIG. 7P shows the signals extracted by the gate 54 and fed to the magnetic head 14. The waveform of FIG. 7Q shows wide-frequency band signals reproduced from the magnetic disc 102 by the magnetic head 14 during the high speed rotation of the magnetic disc 102. The waveform of FIG. 7R shows the frequency demodulated signals derived from the frequency demodulator 65. The waveform of FIG. 7S shows the pulse for detecting the duration of signals so as to detect the beginning position of the recorded signals by the detector 21. The waveform of FIG. 7T shows the gate signal supplied to the gate 20 for extracting the signals during one field or one frame from the narrow-frequency band signals. And, the waveform of FIG. 7U shows narrow-frequency band signals extracted by the gate 20. The time scale of each waveform shown in FIG. 7 is a scale suitable for the high speed rotation of the magnetic disc 102.

Figure 7L:
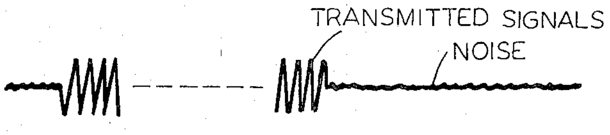
Figure 7M:
Figure 7N:
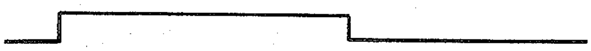
Figure 7P:
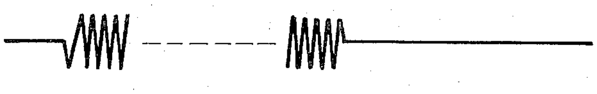
Figure 7Q:
Figure 7R:
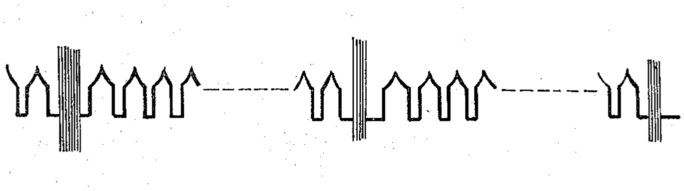
Figures 7S, 7T:
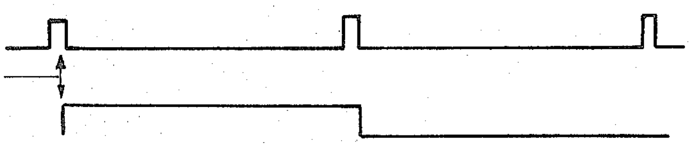
Figure 7U:
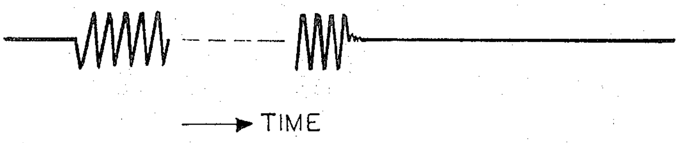

Now referring to FIGS. 6 and 7, the operation of the receiving device will be described. Narrow-frequency band signals transmitted from the transmitting device to the input terminal 50 include the noise from the transmission line, as shown in FIG. 7L, and are supplied to the receiving amplifier 51. The signals derived from the amplifier 51 are fed to the compensator 52 by which the amplitude and the phase characteristics of signals distorted by the transmission line are compensated. Output signals derived from the compensator 52 are supplied to the narrow band signal recording amplifier 53 and to the detector 55. The detector 55 detects the beginning and the end of the transmitted signals and also generates the gate signal supplied to the gate 54, as shown in FIG. 4 N.

On the other hand, the gate 54 is opened to pass signals in response to the gate signal from the detector 55 during a time period from the beginning to the end of the transmitted signals, as shown in FIG. 4 P. When the switch 61 is turned to the pole V, the switch 62 is turned to the pole *t* and the switch 63 is turned to the pole *r* recording current flows through these switches to the magnetic head 14. On the other hand, the holding arm 101 is moved in the direction by a dashed arrow shown in FIG. 6 by energizing the solenoid 25 in response to the pulse corresponding to the beginning of the transmitted signals detected by the detector 55 through the operation controller 58, so that the low speed rotation of the magnetic disc 102 is started by engaging the periphery of the magnetic disc 102 with the capstan 106. Then, when the end of the transmitted signals is detected by the detector 55, the gate 54 is closed to shut off signals in response to the gate signal generated by the detector 55.

On the other hand, the low speed rotation of the magnetic disc 102 is stopped by deenergizing the solenoid 25 through the operation controller 58 which is triggered by the pulse corresponding to the end of the transmitted signals detected by the detector 55. Thus, narrow-frequency band signals transmitted through the transmission line are recorded on the magnetic disc 102 for one field or one frame.

The operation of high speed reproduction is as follows; the recorded signals on the magnetic disc 102 are converted from the narrow-frequency band signals to the wide-frequency band signals shown in FIG. 7 Q by changing the speed of rotation of the magnetic disc 102 from the low speed to the high speed and are reproduced from the magnetic disc 102 by the magnetic head 14. The high speed rotation of the magnetic disc 102 is performed by supplying the driving power from the driving power supply 26 to the high speed driving motor 103. The reproduced signals are supplied to the wide band signal reproducing amplifier 64 through the pole *r* of the switch 63 and the pole *u* of the switch 62.

The waveform of the signals reproduced by the magnetic head 14 has the interruptions in the signals, that is the pause between the beginning and the end of signals recorded on the magnetic disc 102. Output signals derived from the amplifier 64 are supplied to the frequency demodulator 65 in which signals are demodulated to wide band video signals, as shown in FIG. 4 R. The video signals amplified by the video amplifier 66 are displayed on the television receiver 67 as a still picture.

The noise existing in the video signals shown in FIG. 4 R is produced similarly as in the transmitting device. Thus, the narrow-frequency band signals transmitted through the transmission line are recorded on the magnetic disc 102, and then the signals are reproduced from the magnetic disc for recording on the magnetic tape 107 by the same operation as described in commection with to FIG. 1. The operation of reproducing narrow-frequency band signals from the magnetic tape 107 for recording them on the magnetic disc 102 during the low speed rotation of the magnetic disc 102 and the movement of the magnetic tape 107 is also carried out as described in connection with FIG. 1.

Then, by the operation of the high speed reproduction described in connection with FIG. 1, recorded signals on the magnetic disc 102 are converted from the narrow-frequency band signals to the wide-frequency band signals by changing the speed of rotation of the magnitude disc 102 from the low speed to the high speed and are reproduced from the magnetic disc 102 by the magnetic head 14 and then are recovered as video signals which are displayed as a still picture on the television receiver 67.

Figure 8:
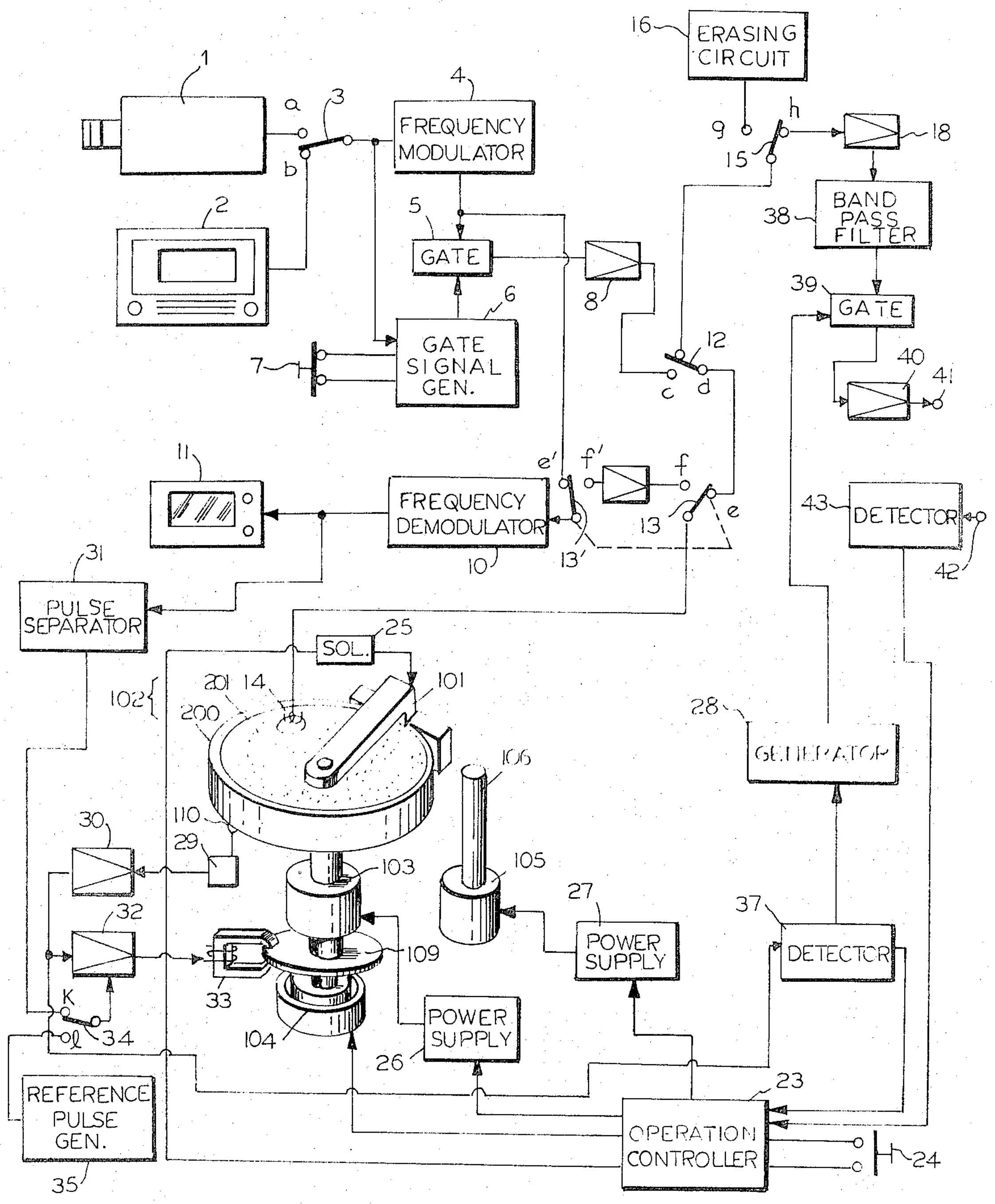
FIG. 8 is a schematic diagram showing another embodiment of the transmitting device of the signal transmission system according to this invention.
Figure 9:
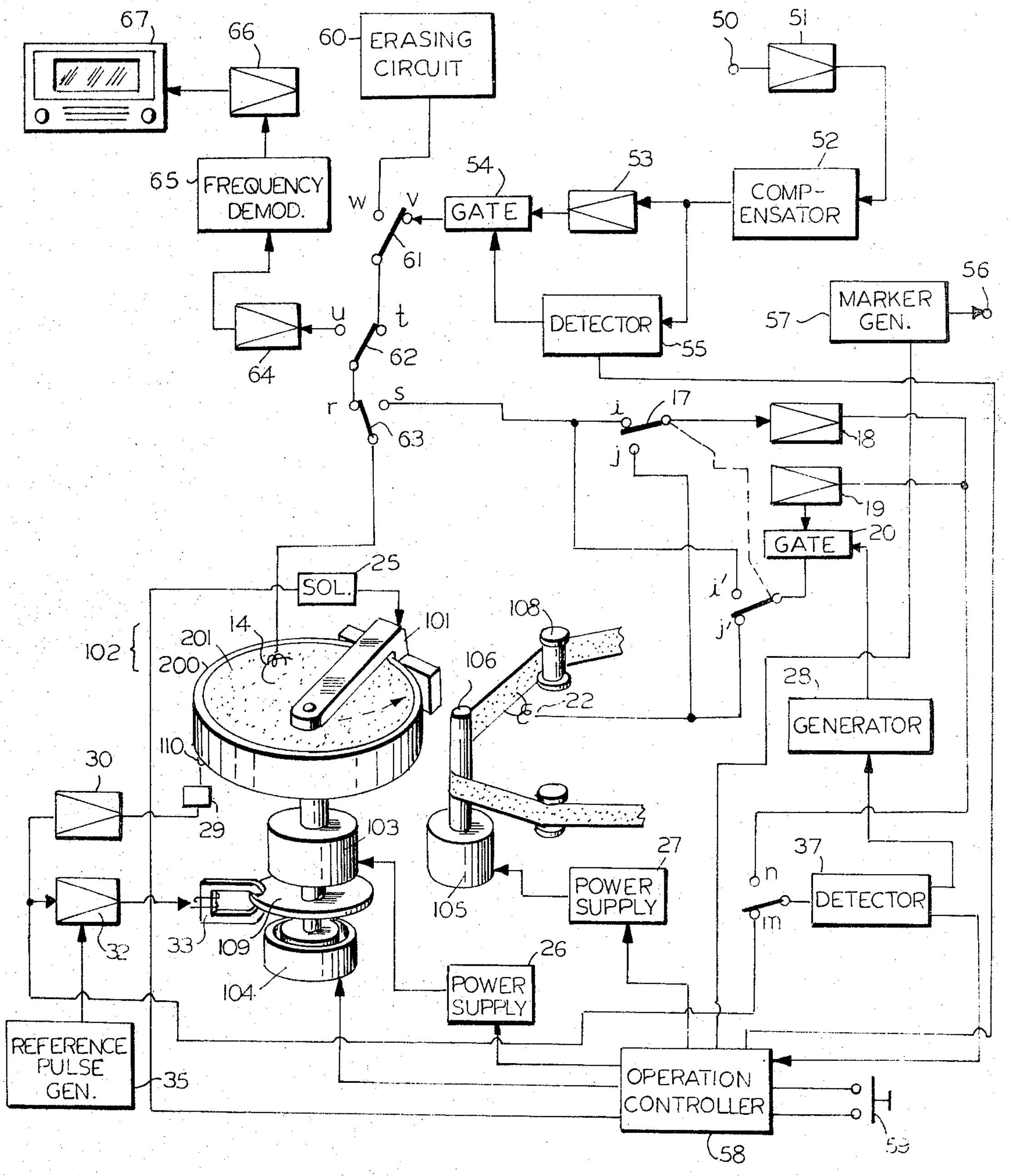
FIG. 9 is a schematic diagram showing another embodiment of the receiving device of the signal transmission system according to this invention.

The construction of another embodiment of the transmitting device and the receiving device based on the embodiment shown in FIG. 3 according to this invention are shown in FIGS. 8 and 9. In the transmitting device shown in FIG. 8, the differences in the structure and operation between the device and that of FIG. 5 are the same as those described in connection with the differences between FIG. 1 and FIG. 3, and the operation of the device is easily understood from the description for FIGS. 3 and 5. On the other hand, in the receiving device shown in FIG. 9, the differences in the operation are as follows.

First, when the transmitted signals from the transmitting device are recorded on the magnetic disc 102 or recorded signals on the magnetic disc 102 are reproduced to be recorded on the magnetic tape 107, the magnetic disc 102 is located at a position so that the beginning position of recorded signals is coincident with the postion of the magnetic head 14 by the pulse signal corresponding to the predetermined position 110 from which the signals are recorded on the magnetic disc 102 during one rotation, and the gate signal for extracting the signals during one rotation of the magnetic disc 102 is generated in response to the pulse signal corresponding to the predetermined position 110 on the magnetic disc 102.

Second, in the operation of the high speed reproduction, the rotational phase of the magnetic disc 102 is controlled so as to synchronize the pulse signal corresponding to the predetermined position 110 with reference pulses, whereby the frequency of vertical synchronizing pulses included in the video signals to be reproduced is determined.

The operation of the device is easily understood referring to the description for FIGS. 3 and 6. In the construction of the device as compared to the apparatus shown in FIG. 3, the switch 34 for directing the input pulse to the rotational phase controller 32 is omitted, and only the reference pulses are supplied to the rotational speed controller 32.

It will be apparent from the foregoing that while particular forms of this invention have been illustrated and described, various modifications can be made without departing from the spirit and scope of the invention as defined by the appended claims.

What is claimed is:

1. A signal recording and reproducing apparatus comprising:

a magnetic disc recorder including at least one magnetic disc, a low speed driving means including a capstan engageable with the periphery of said magnetic disc for rotation of said magnetic disc at a low speed, a magnetic disc head means positioned adjacent said magnetic disc, moving means coupled to said capstan for moving said capstan away from the periphery of said magnetic disc at least during the high speed rotation of said magnetic disc, and a first narrow band reproducing means coupled to said magnetic head means for reproducing signals previously recorded on said magnetic disc during the low speed rotation of said magnetic disc, and a magnetic tape recorder including a magnetic tape and a tape transporting means for moving a magnetic tape at a predetermined speed, a magnetic tape head means positioned adjacent the magnetic tape, and a first narrow band recording means coupled to said magnetic tape head means and to said narrow band reproducing means for recording the signals reproduced from said magnetic disc on said magnetic tape during the movement of said magnetic tape;

said magnetic tape being between said capstan and said periphery of said magnetic disc for synchronization of the movement of said magnetic tape with said low speed rotation of said magnetic disc.

2. A signal recording and reproducing apparatus as claimed in claim 1 wherein said magnetic disc recorder further includes a high speed driving means for rotating said magnetic disc at a high speed, and a wide band recording means coupled to said magnetic head means for recording wide-frequency band signals supplied to said magnetic disc recorder on said magnetic disc during the high speed rotation of said magnetic disc, whereby the signals recorded on said magnetic disc are converted from wide-frequency band signals into narrow-frequency band signals and are reproduced from said magnetic disc by changing the rotational speed of said magnetic disc from said high speed to said low speed.

3. A signal recording and reproducing apparatus as claimed in claim 2 wherein said magentic disc recorder further includes a detecting means for detecting a beginning position of said magnetic disc from which said wide-frequency band signals have been recorded during the reproduction of said narrow frequency band signals, and a gate means coupled in the circuit of said first narrow band reproducing means and said first narrow band recording means and to said detecting means for sending out said narrow frequency band signals to said magnetic tape in response to an output signal of said detecting means during a time period between two successive times corresponding to said beginning position detected by said detecting means.

4. A signal recording and reproducing apparatus as claimed in claim 3 wherein said magnetic disc recorder further includes a control means including position detecting means associated with said magnetic disc for detecting a predetermined position on said magnetic disc during said high speed rotation and generates a pulse signal and means for controlling the rotational phase of said high speed rotation associated with said magnetic disc to control the speed of rotation of said magnetic disc signal with synchronizing pulses included in said wide-frequency band signals, said detecting means also being coupled to said position detecting means for detecting said predetermined position, whereby said wide-frequency band signals start to be recorded on said magnetic disc at said predetermined position.

5. A signal recording and reproducing apparatus as claimed in claim 1 in which said magnetic disc head means is a single magnetic head, and said apparatus further comprises switch means coupled between said magnetic head, said wide band recording means and said first narrow band reproducing means for connecting said magnetic head to said wide band recording means or said narrow band reproducing means.

6. A signal recording and reproducing apparatus as claimed in claim 1 wherein said magnetic tape recorder further includes switch means for connecting said narrow band reproducing means to said recording tape head means and said narrow band recording means to said magnetic disc head means, whereby said narrow-frequency band signals recorded on said magnetic tape are recorded on said magnetic disc at said low speed rotation through said magnetic tape head means, said narrow band reproducing means, said narrow band recording means, and said magnetic disc head means during movement of said magnetic tape.

7. A signal transmission system comprising a transmitting device including at least one first magnetic disc and a first magnetic disc head means associated therewith, a first low speed driving means coupled to said first magnetic disc for rotating said first magnetic disc at a low speed, a first narrow band reproducing means coupled to said first magnetic disc head means for reproducing signals previously recorded on said first magnetic disc during the low speed rotation of said first magnetic disc, a locating means associated with said first magnetic disc for locating said first magnetic disc at a position so that a beginning position of said signals previously recorded on said first magnetic disc is coincident with a position of said first magnetic disc head means, and an output means coupled to said first narrow band reproducing means for transmitting the reproduced signal to a transmission line from said beginning position during one rotation of said first magnetic disc at said low speed; and a receiving device including at least one second magnetic disc and a second magnetic disc head means associated therewith, a second low speed driving means coupled to said second disc for rotating said second magnetic disc at a low speed, an input means for receiving signals from the transmission line, a first detecting means coupled to said input means and said second low speed driving means for detecting the beginning and the end of the transmitted signals, and a first narrow band recording means coupled to said input means, said detecting means and said second magnetic disc head means for recording said transmitted signals on said second magnetic disc under the control of said first detecting means during the low speed rotation of said magnetic disc, whereby said transmitting device transmits said reproduced signals to said transmission line as soon as said low speed rotation of said first magnetic disc is started, and said receiving device begins to record said transmitted signals on said second magnetic disc upon detection of the beginning of said transmitted signals and stops recording upon detection of the end of said transmitted signals.

8. A signal transmission system as claimed in claim 7 wherein said transmitting device further includes a first high speed driving means coupled to said first magnetic disc for rotating said first magnetic disc at a high speed, a wide band recording means coupled to said first magnetic disc head means for recording wide-frequency band signals supplied to said transmitting device on said first magnetic disc during the high speed rotation of said first magnetic disc; and said receiving device further includes a second high speed driving means coupled to said second magnetic disc for rotating said second magnetic disc at a high speed, a wide band converting means coupled to said second magnetic disc head means for converting the signals recorded on said second magnetic disc into wide-frequency band signals during said high speed rotation of said second magnetic disc, whereby the signals recorded on said first magnetic disc are converted from wide-frequency band signals into narrow-frequency band signals by changing the rotational speed of said first magnetic disc from said high speed to said low speed and are transmitted to said second magnetic disc by said transmission line and then are converted from narrow-frequency band signals into wide-frequency band signals by changing the rotational speed of said second magnetic disc from said low speed to said high speed.

9. A signal transmission system as claimed in claim 7 wherein said transmitting device further includes a first control means including position detecting means associated with said first magnetic disc for detecting a predetermined position on said first magnetic disc during said high speed rotation and generates a pulse signal, and means for controlling the rotational phase of said high speed rotation associated with said first magnetic disc to control the speed of rotation of said first magnetic disc to synchronize said pulse signal with synchronizing pulses included in said wide-frequency band signals, said control means also locating said first magnetic disc at a position so that said predetermined position is coincident with the position of said first magnetic head, whereby said wide-frequency band signals start to be recorded on said first magnetic disc at said predetermined position.

10. A signal transmission system as claimed in claim 7 wherein said receiving device further includes a second control means including a further position detecting means associated with said second magnetic disc for detecting another predetermined position on said second magnetic disc during said high speed rotation and generates a pulse signal, and further means for controlling the rotational phase of said high speed rotation associated with said second magnetic disc to control the speed of rotation of said second magnetic disc to synchronize said pulse signal with reference pulses, whereby the frequency of synchronizing pulses included in the signals which are to be converted into the wide frequency band signals at said high speed rotation of said second magnetic disc is determined.

11. A signal transmission system as claimed in claim 7 wherein said receiving device further includes a second narrow band reproducing means coupled to said second magnetic disc head means for reproducing the signals recorded on said second magnetic disc during said low speed rotation, a second detecting means for detecting the beginning position of said second magnetic disc from which said signals have been recorded during the reproducion of said signals recorded on said second magnetic disc, a tape transporting means for moving a magnetic tape at a predetermined speed synchronously with the low speed rotation of said second magnetic disc, and a second narrow band recording means coupled to said second narrow band reproducing means and including a magnetic tape head means for recording the reproduced signals from said second magnetic disc on said magnetic tape in response to an output signal of said second detecting means during a time period between two successive times corresponding to said beginning position detected by said second detecting means, whereby said transmitted signals recorded on said second magnetic disc are recorded on said magnetic tape as narrow-frequency band signals.

* * * * *

UNITED STATES PATENT OFFICE

CERTIFICATE OF CORRECTION

Patent No. 3,775,568 Dated November 27, 1973

Inventor(s) TETSUO HINO ET AL

It is certified that error appears in the above-identified patent and that said Letters Patent are hereby corrected as shown below:

Column 20, line 43, "converting" should read --reproducing--;

line 45, "converting" should read --reproducing wide-frequency band signals from--;

line 46, delete "into wide-frequency band signals".

Signed and sealed this 10th day of December 1974.

(SEAL)
Attest:

McCOY M. GIBSON JR.
Attesting Officer

C. MARSHALL DANN
Commissioner of Patents